(12) United States Patent
Moon et al.

(10) Patent No.: US 12,137,232 B2
(45) Date of Patent: Nov. 5, 2024

(54) METHOD AND APPARATUS FOR ENCODING/DECODING IMAGE SIGNAL

(71) Applicant: Industry Academy Cooperation Foundation of Sejong University, Seoul (KR)

(72) Inventors: Joo Hee Moon, Seoul (KR); Sung Won Lim, Seoul (KR); Dong Jae Won, Goyang-si (KR)

(73) Assignee: Industry Academy Cooperation Foundation of Sejong University, Seoul (KR)

( * ) Notice: Subject to any disclaimer, the term of this patent is extended or adjusted under 35 U.S.C. 154(b) by 0 days.

(21) Appl. No.: 18/367,121

(22) Filed: Sep. 12, 2023

(65) Prior Publication Data

US 2023/0421782 A1   Dec. 28, 2023

Related U.S. Application Data

(63) Continuation of application No. 17/981,715, filed on Nov. 7, 2022, now Pat. No. 11,876,983, which is a
(Continued)

(30) Foreign Application Priority Data

Apr. 29, 2016  (KR) .................. 10-2016-0052699
Apr. 29, 2016  (KR) .................. 10-2016-0052702
(Continued)

(51) Int. Cl.
*H04N 19/176*   (2014.01)
*H04N 19/105*   (2014.01)
(Continued)

(52) U.S. Cl.
CPC ......... *H04N 19/176* (2014.11); *H04N 19/105* (2014.11); *H04N 19/132* (2014.11);
(Continued)

(58) Field of Classification Search
CPC .. H04N 19/176; H04N 19/105; H04N 19/132; H04N 19/136; H04N 19/167; H04N 19/196; H04N 19/50; H04N 19/503
(Continued)

(56) References Cited

U.S. PATENT DOCUMENTS 8,208,557 B2   6/2012   Lee et al.
8,284,837 B2   10/2012  Yin et al.
(Continued)

FOREIGN PATENT DOCUMENTS

CN   101573982 A   11/2009
CN   101766030 A   6/2010
(Continued)

OTHER PUBLICATIONS

Seregin et al., Weighted prediction for intra block copy, Oct. 2015, Joint Collaborative Team on Video Coding (JCT-VC) of ITU-T SG 16 WP 3 and ISO/IEC JTC 1/SC 29/WG 11, 22nd Meeting: Geneva, CH, Oct. 15-21, 2015, Document: JCTVC-V0044 (Year: 2015).*
(Continued)

*Primary Examiner* — Marnie A Matt
(74) *Attorney, Agent, or Firm* — NSIP Law

(57) ABSTRACT

A method for decoding an image signal according to the present invention may comprise the steps of: determining whether there is a brightness change between a current image including a current block and a reference image of the current image; if it is determined that there is a brightness change between the current image and the reference image, determining weight prediction parameter candidates for the current block; determining a weight prediction parameter for
(Continued)

the current block on the basis of index information which specifies any one of the weight prediction parameter candidates; and performing a prediction on the current block on the basis of the weight prediction parameter.

5 Claims, 12 Drawing Sheets

Related U.S. Application Data continuation of application No. 17/743,590, filed on May 13, 2022, now Pat. No. 11,750,823, which is a continuation of application No. 17/159,240, filed on Jan. 27, 2021, now Pat. No. 11,363,280, which is a continuation of application No. 16/097,419, filed as application No. PCT/KR2017/004574 on Apr. 28, 2017, now Pat. No. 10,939,125.

(30) Foreign Application Priority Data

| Apr. 18, 2017 | (KR) | .................. 10-2017-0050051 |
| Apr. 18, 2017 | (KR) | .................. 10-2017-0050052 |

(51) Int. Cl.
| H04N 19/132 | (2014.01) |
| H04N 19/136 | (2014.01) |
| H04N 19/167 | (2014.01) |
| H04N 19/196 | (2014.01) |
| H04N 19/50 | (2014.01) |
| H04N 19/503 | (2014.01) |

(52) U.S. Cl.
CPC ......... *H04N 19/136* (2014.11); *H04N 19/167* (2014.11); *H04N 19/196* (2014.11); *H04N 19/50* (2014.11); *H04N 19/503* (2014.11)

(58) Field of Classification Search
USPC ................................. 375/240.12
See application file for complete search history.

(56) References Cited

U.S. PATENT DOCUMENTS

| 9,544,593 | B2 | 1/2017 | Park et al. | |
| 10,735,720 | B2* | 8/2020 | Lee | H04N 19/10 |
| 10,742,973 | B2* | 8/2020 | Park | H04N 19/17 |
| 11,750,823 | B2* | 9/2023 | Moon | H04N 19/50 |
| | | | | 375/240.12 |
| 2004/0246373 | A1 | 12/2004 | Kadono et al. | |
| 2008/0181306 | A1* | 7/2008 | Kim | H04N 19/61 |
| | | | | 375/E7.125 |
| 2008/0253456 | A1 | 10/2008 | Yin et al. | |
| 2009/0034854 | A1* | 2/2009 | Lee | H04N 19/176 |
| | | | | 375/E7.125 |
| 2009/0257492 | A1* | 10/2009 | Andersson | H04N 19/11 |
| | | | | 375/E7.243 |
| 2012/0236943 | A1 | 9/2012 | Lee et al. | |
| 2013/0272404 | A1 | 10/2013 | Park et al. | |
| 2013/0272411 | A1 | 10/2013 | Tu et al. | |
| 2014/0139627 | A1* | 5/2014 | Chen | H04N 19/176 |
| | | | | 348/43 |
| 2014/0169451 | A1* | 6/2014 | Cohen | H04N 19/50 |
| | | | | 375/240.03 |
| 2014/0198846 | A1 | 7/2014 | Guo et al. | |
| 2014/0269939 | A1* | 9/2014 | Guo | H04N 19/132 |
| | | | | 375/240.26 |
| 2014/0328403 | A1 | 11/2014 | Lim et al. | |
| 2015/0222912 | A1* | 8/2015 | Chuang | H04N 19/70 |
| | | | | 375/240.12 |
| 2015/0222921 | A1* | 8/2015 | Sato | H04N 19/96 |
| | | | | 375/240.12 |
| 2015/0271523 | A1* | 9/2015 | Sung | H04N 19/52 |
| | | | | 375/240.16 |
| 2017/0171561 | A1 | 6/2017 | Sung et al. | |
| 2018/0131943 | A1* | 5/2018 | Park | H04N 19/86 |
| 2018/0288410 | A1 | 10/2018 | Park et al. | |
| 2019/0238835 | A1 | 8/2019 | Lee | |
| 2022/0201286 | A1* | 6/2022 | Tsai | H04N 19/593 |

FOREIGN PATENT DOCUMENTS

| CN | 102656887 A | | 9/2012 | | |
| CN | 103404151 A | | 11/2013 | | |
| CN | 104813668 A | | 7/2015 | | |
| KR | 10-2007-0051334 A | | 5/2007 | | |
| KR | 10-2007-0051334 A | | 5/2007 | | |
| KR | 10-2008-0070216 A | | 7/2008 | | |
| KR | 10-2008-0070216 A | | 7/2008 | | |
| KR | 10-2009-0012926 A | | 2/2009 | | |
| KR | 10-2009-0012926 A | | 2/2009 | | |
| KR | 10-2013-0085838 A | | 7/2013 | | |
| KR | 10-2013-0085838 A | | 7/2013 | | |
| KR | 20140097056 A | * | 6/2014 | ........... | H04N 19/105 |
| KR | 10-2014-0097056 A | | 8/2014 | | |
| KR | 10-2014-0097056 A | | 8/2014 | | |
| WO | WO-2011074874 A2 | * | 6/2011 | ....... | H04N 19/00733 |
| WO | WO 2014/058207 A1 | | 4/2014 | | |
| WO | WO 2014/058207 A1 | | 4/2014 | | |

OTHER PUBLICATIONS

Chinese Office Action issued on Sep. 20, 2022, in counterpart Chinese Patent Application No. 201780041348.7 (10 pages in English, 7 pages in Chinese).

U.S. Office Action dated Jul. 19, 2023, in related U.S. Appl. No. 17/883,881 (6 pages).

* cited by examiner

| POSITION | A | B | C | D | E | col |
|---|---|---|---|---|---|---|
| list0 | (65,1) | (64,2) | (66,-2) | × | (61,7) | (59,-2) |
| list1 | (57,-7) | × | (67,8) | (50,0) | × | × |

| POSITION | A | B | C | D |
|----------|------|------|--------|--------|
| list0 | (65,1) | × | (66,-2) | × |
| list1 | × | × | (67,8) | (50,0) |

| POSITION | A | B | C | D |
|----------|--------|--------|--------|--------|
| list0 | (65,1) | (65,-2) | (66,-2) | (66,1) |
| list1 | (67,0) | (50,8) | (67,8) | (50,0) |

METHOD AND APPARATUS FOR ENCODING/DECODING IMAGE SIGNAL

CROSS REFERENCE TO RELATED APPLICATIONS

This application is a continuation of U.S. patent application Ser. No. 17/981,715 filed on Nov. 7, 2022, which is a continuation of U.S. patent application Ser. No. 17/743,590 filed on May 13, 2022, now U.S. Pat. No. 11,750,823 issued on Sep. 5, 2023, which is a continuation of U.S. patent application Ser. No. 17/159,240 filed on Jan. 27, 2021, now U.S. Pat. No. 11,363,280 issued on Jun. 14, 2022, which is a continuation of U.S. patent application Ser. No. 16/097,419 filed on Oct. 29, 2018, now U.S. Pat. No. 10,939,125 issued on Mar. 2, 2021, which is a U.S. National Stage Application of International Application No. PCT/KR2017/004574, filed on Apr. 28, 2017, which claims the benefit under 35 USC 119(a) and 365(b) of Korean Patent Application No. 10-2016-0052699, filed on Apr. 29, 2016, Korean Patent Application No. 10-2016-0052702, filed on Apr. 29, 2016, Korean Patent Application No. 10-2017-0050051, filed on Apr. 18, 2017, Korean Patent Application No. 10-2017-0050052, filed on Apr. 18, 2017 in the Korean Intellectual Property Office.

TECHNICAL FIELD

The present invention relates to a video signal encoding/decoding method and apparatus.

BACKGROUND ART

In recent years, demand for multimedia data such as moving pictures is rapidly increasing on the Internet. However, the rate at which the bandwidth of a channel develops is hard to follow the amount of multimedia data that is rapidly increasing. As a result, Video Coding Expert Group (VCEG) of the International Organization for Standardization (ITU-T) and MPEG (Moving Picture Expert Group) of ISO/IEC have issued High Efficiency Video Coding (HEVC) version 1 in February 2014.

HEVC defines techniques such as intra prediction, inter prediction, transform, quantization, entropy coding, and in-loop filters. Among them, the inter prediction is performed by using the previously reconstructed pictures and motion information such as a motion vector, a reference picture index, a prediction direction (Inter prediction indicator), etc.

The higher the correlation between images, the higher the prediction efficiency may be obtained. However, the inter prediction result may be inaccurate if the correlation between the images is lowered because of a change in brightness between images such as a fade-in or a fade-out. In order to solve such a problem, the present invention proposes weight prediction. Here, the weight prediction may mean that, when there is a brightness change between images, the weight is estimated by the degree of brightness change, and the estimated weight is applied to the inter prediction.

DISCLOSURE

Technical Problem

The main object of the present invention is to improve inter prediction efficiency by performing inter prediction using a weight in encoding/decoding an image.

The main object of the present invention is to provide an apparatus and a method capable of effectively performing inter prediction by selectively using a weight in encoding/decoding an image even when a plurality of light sources exist in an image or a brightness change exists only in a local region.

Technical Solution

The method and apparatus for decoding a video signal according to the present invention determines whether there is a brightness change between a current image including a current block and a reference image of the current image, determines a weight prediction parameter candidate for the current block if there is a brightness change between the current image and the reference image, determines a weight prediction parameter for the current block based on index information for specifying any one of the weight prediction parameter candidate, and performs prediction of the current block based on the weight prediction parameter.

In the method and apparatus for decoding a video signal according to the present invention, the weight prediction parameter candidate may include a first weight prediction parameter for the reference image.

In the method and apparatus for decoding a video signal according to the present invention, when the current image includes at least one region capable of deriving a second weight prediction parameter, the weight prediction parameter candidate further includes at least one second weight prediction parameter.

In the method and apparatus for decoding a video signal according to the present invention, the first weight prediction parameter may be derived based on a prediction value for the first weight prediction parameter and a residual value for the first weight prediction parameter.

In the method and apparatus for decoding a video signal according to the present invention, the prediction value for the first weight prediction parameter may be determined according to the accuracy of the current block.

In the method and apparatus for decoding a video signal according to the present invention, the maximum number of the weight prediction parameter candidate may be adaptively determined according to a size of the current block.

In the method and apparatus for decoding a video signal according to the present invention, the weight prediction parameter candidate may include an initial weight prediction parameter having a predetermined weight value.

The method and apparatus for encoding a video signal according to the present invention determines whether there is a brightness change between a current image including a current block and a reference image of the current image, determines a weight prediction parameter candidate for the current block if there is a brightness change between the current image and the reference image, determines a weight prediction parameter for the current block among the weight prediction parameter candidate, encodes index information for specifying the determined weight prediction parameter, and performs prediction of the current block based on the weight prediction parameter.

In the method and apparatus for encoding a video signal according to the present invention, the weight prediction parameter candidate may include a first weight prediction parameter for the reference image.

In the method and apparatus for encoding a video signal according to the present invention, when the current image includes at least one region capable of deriving a second weight prediction parameter, the weight prediction parameter candidate further includes at least one second weight prediction parameter.

The method and apparatus for decoding a video signal according to the present invention encodes a residual value indicating a difference between the first weight prediction parameter and a prediction value for the first weight prediction parameter.

In the method and apparatus for encoding a video signal according to the present invention, the prediction value for the first weight prediction parameter may be determined according to the accuracy of the current block.

In the method and apparatus for encoding a video signal according to the present invention, the maximum number of the weight prediction parameter candidate may be adaptively determined according to a size of the current block.

In the method and apparatus for encoding a video signal according to the present invention, the weight prediction parameter candidate may include an initial weight prediction parameter having a predetermined weight value.

Advantageous Effects

In the present invention, the inter prediction efficiency is improved by performing inter prediction using a weight in encoding/decoding an image.

The present invention may effectively perform inter prediction by selectively using a weight in encoding/decoding an image even when a plurality of light sources exist in an image or a brightness change exists only in a local region.

MODE FOR CARRYING OUT THE INVENTION

Figure 1:
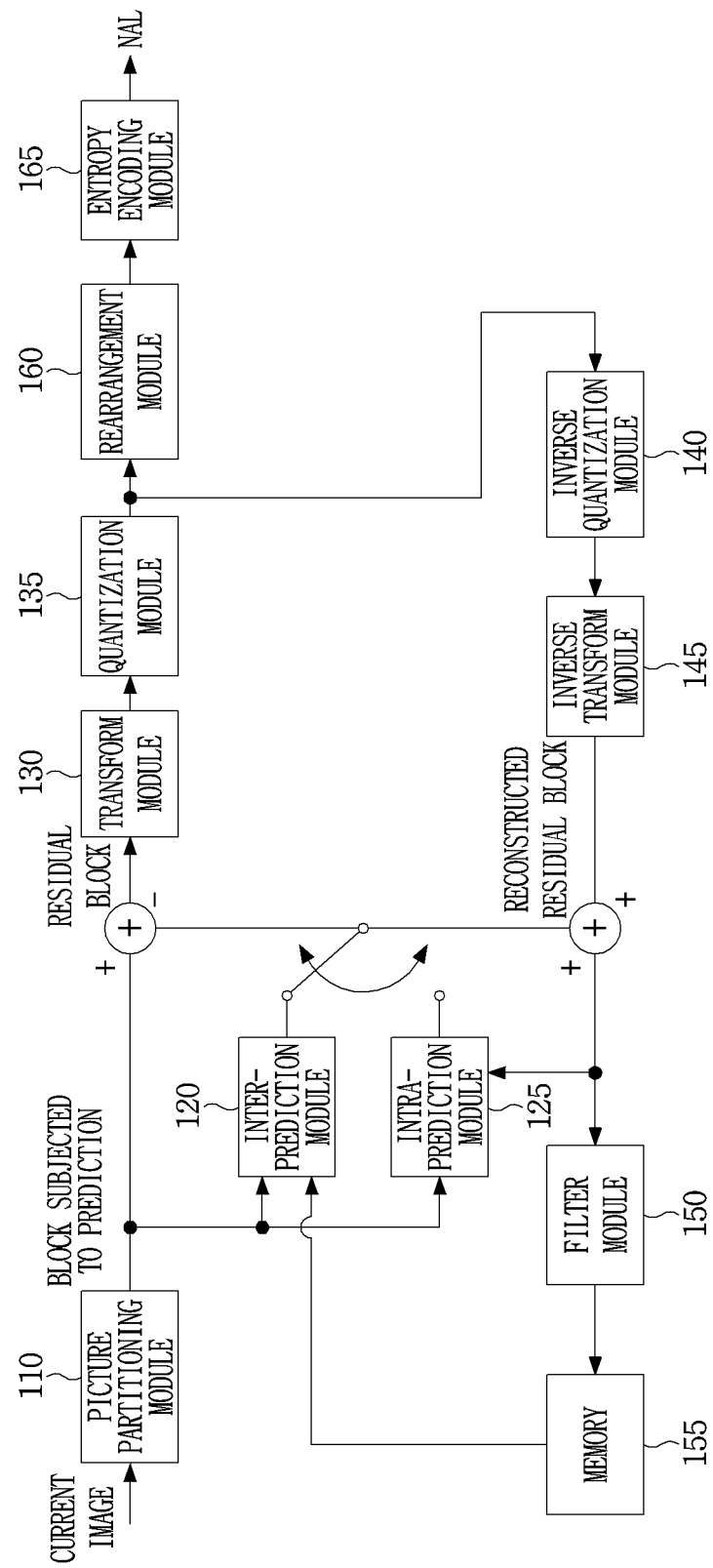
FIG. 1 is a block diagram illustrating an image encoding apparatus according to an embodiment of the present invention.

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating an image encoding apparatus according to an embodiment of the present invention.

Referring to FIG. 1, the image encoding apparatus 100 includes an image dividing unit 110, prediction units 120 and 125, a transform unit 130, a quantization unit 135, a reordering unit 160, an entropy encoding unit 165, an inverse quantization unit 140, an inverse transform unit 145, a filter unit 150, and a memory 155.

Each of the elements shown in FIG. 1 is shown independently to represent different characteristic functions in the encoding apparatus, and may not mean that each component consists of separate hardware or a single software unit. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The image dividing unit 110 may divide an input image into at least one block. At this time, a block may mean a coding unit (CU), a prediction unit (PU), or a transform unit (TU). The division may be performed based on at least one of a quad tree or a binary tree. The quad tree is a method of dividing an upper block into sub-blocks whose width and height are half of an upper block. The binary tree is a method of dividing an upper block into sub-blocks whose either width or height is half of an upper block. A block may have a non-square shape as well as a square shape based on the above-described quad tree or binary tree-based division.

In the embodiments of the invention, a CU may be used to refer to not only a unit of encoding but also a unit of decoding.

The prediction units 120 and 125 may include an inter prediction unit 120 to perform inter prediction and an intra prediction unit 125 to perform intra prediction. The prediction units 120 and 125 may determine which of inter prediction and intra prediction is performed on a PU, and may determine specific information (for example, an intra prediction mode, a motion vector, and a reference picture) of the determined prediction method. Here, a processing unit on which prediction is performed may be different from a processing unit for which a prediction method and specific information thereon are determined. For example, a prediction method and a prediction mode may be determined for each PU, while prediction may be performed for each TU.

A residual value (residual block) between a generated predicted block and an original block may be input to the transform unit 130. Further, prediction mode information, motion vector information and the like used for prediction may be encoded along with the residual value by the entropy encoding unit 165 and be transmitted to the decoding apparatus. When a specific encoding mode is used, the original block may be encoded and transmitted to the decoding apparatus without generating a prediction block by the prediction units 120 and 125.

The inter prediction unit 120 may predict a PU based on information on at least one image among a previous image of a current image and a subsequent image of a current image. In some cases, the inter prediction unit 120 may predict a PU based on information of a partially encoded region in the current picture. The inter prediction unit 120 may include a reference image interpolation unit, a motion information generation unit, and a motion compensation unit.

The reference image interpolation unit may be supplied with reference image information from the memory 155 and generate pixel information less than or equal to an integer pixel on a reference image. In the case of luminance pixels, a DCT-based 8-tap interpolation filter with a variable filter coefficient may be used to generate pixel information less than or equal to an integer pixel in a unit of a ¼ pixel. In the case of chrominance pixels, a DCT-based 4-tap interpolation filter with a variable filter coefficient may be used to generate pixel information less than or equal to an integer pixel in a unit of a ⅛ pixel.

The motion information generation unit may generate motion information based on the reference image interpolated by the reference image interpolation unit. Here, the motion information refers to a motion vector, a reference image index, a prediction direction, and the like. As a method for estimating a motion vector, various methods such as FBMA (Full Search-based Block Matching Algorithm), TSS (Three Step Search) and NTS (New Three-Step Search Algorithm) may be used. Further, the motion vector may have a motion vector value of ½ or ¼ pixel unit based on the interpolated pixel. In the inter prediction, the current prediction unit may be predicted by differently generating the motion information. As the motion information generation method, various methods such as a merge method using a motion vector of a neighboring block and a motion estimation method (e.g., AMVP (Adaptive Motion Vector Prediction)) may be used.

Figure 3:
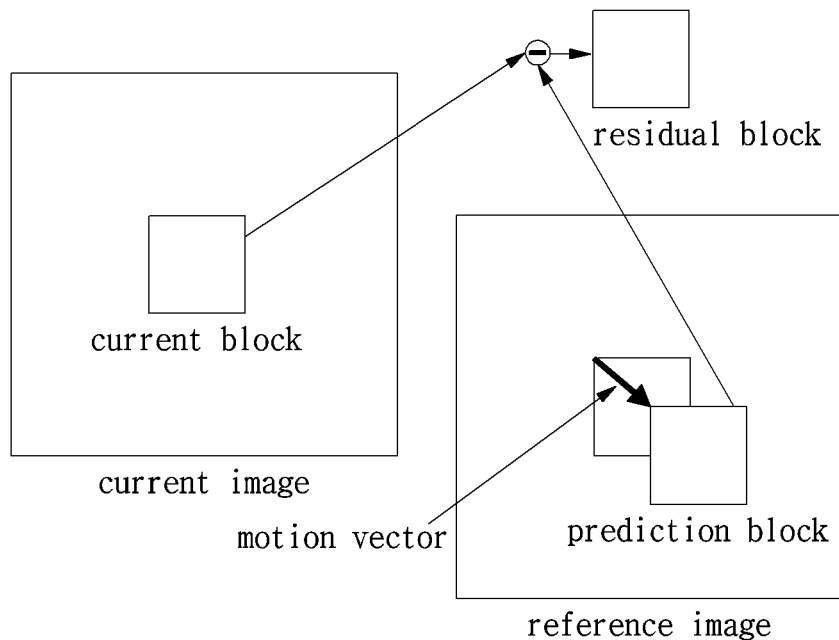
FIG. 3 is a block diagram schematically illustrating a motion estimation method according to an embodiment of the present invention.

For example, FIG. 3 is a block diagram schematically illustrating a motion estimation method according to an embodiment of the present invention. The motion estimation is to determine a motion vector of a current block, a reference image index, and an inter prediction direction according to the determination, when a reference block that is the same as or similar to a prediction block in a reference image that has already been encoded and decoded is determined.

When the AMVP method is used, the encoding apparatus may generate a predicted motion vector (MVP: Motion Vector Prediction) by predicting a motion vector estimated in the current block, and encode a difference value (MVD: Motion Vector Difference) between the motion vector and the generated predicted motion vector.

Figure 4:
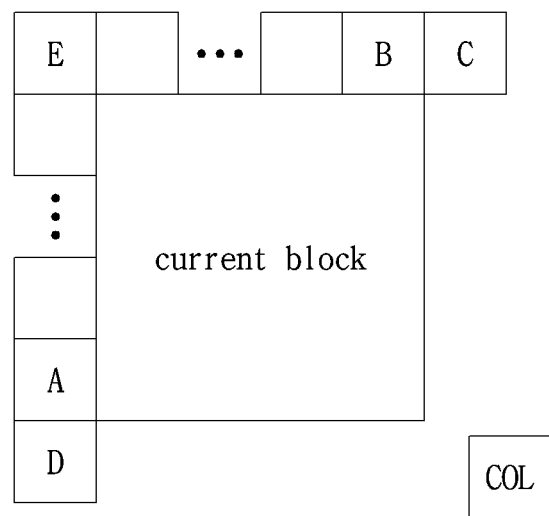
FIG. 4 is a diagram illustrating locations of neighboring blocks for obtaining motion information to be applied to a current block to be coded according to an embodiment of the present invention.

A method of using a motion vector of a neighboring block is to apply motion information of a neighboring block neighboring the current block to the current block. In this case, the neighboring block may include a spatial neighboring block adjacent to the current block and a temporal neighboring block which exists at the same position as the current block and is included in the reference image. The encoding apparatus may determine motion information of a current block by applying motion information of neighboring blocks (spatial neighboring blocks: A to E, temporal neighboring block: Col) of the current block shown in FIG. 4 to the current block. Herein, Col denotes a block which has the same or similar position as the current block and exists in the reference image.

The intra prediction unit 125 may generate a prediction unit based on the reference pixel information around the current block which is pixel information in the current image. In the case where the neighboring block of the current prediction unit is the block in which the inter prediction is performed, and the reference pixel is the reconstructed pixel by performing the inter prediction, the reference pixel included in the block in which the inter prediction is performed may be replaced with the reference pixel information of the block in which the intra prediction is performed. That is, when the reference pixel is not available, the unavailable reference pixel information may be replaced with at least one of the available reference pixels.

In the intra prediction, the prediction mode may have a directional prediction mode in which the reference pixel information is used according to the prediction direction, and a non-directional mode in which the direction information is not used in performing the prediction. The mode for predicting the luminance information may be different from the mode for predicting the chrominance information. The intra prediction mode information used for predicting the luminance information or predicted luminance signal information may be used to predict the chrominance information.

In the intra prediction method, a predicted block may be generated by applying an adaptive intra smoothing (AIS) filter to the reference pixels according to the prediction mode. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same prediction mode may be transmitted using predetermined flag information. When the current PU and the neighboring PU have different prediction modes, information on the prediction mode of the current block may be encoded by entropy encoding.

In addition, a residual block including residual information that is a difference value between a prediction unit that has been predicted based on the prediction unit generated by the prediction units (120, 125) and the original block of the prediction unit may be generated. The generated residual block may be input to the transform unit 130.

The transform unit 130 may transform the residual block including the residual data using a transform method such as DCT, DST, Karhunen Loeve Transform (KLT), or the like. In this case, the transform method may be determined based on the intra prediction mode of the prediction unit used to generate the residual block. For example, DCT may be used for the horizontal direction, and DST may be used for the vertical direction, depending on the intra prediction mode.

The quantization unit 135 may quantize the values transformed into the frequency domain by the transform unit 130. The quantization coefficient may vary depending on the block or the importance of the image. The values calculated by the quantization unit 135 may be provided to the inverse quantization unit 140 and the reordering unit 160.

The transform unit 130 and/or the quantization unit 135 may be selectively included in the image encoding apparatus 100. That is, the image encoding apparatus 100 may perform at least one of transform or quantization on the residual data of the residual block, or may encode the residual block by skipping both the transform and the quantization. A block entering the input of the entropy encoding unit 165 is generally referred to as a transform block even though either the transform or the quantization is not performed in the image encoding apparatus 100 or both the transform and the quantization are not performed.

The reordering unit 160 may reorder the coefficient values with respect to the quantized residual values.

The reordering unit 160 may change coefficients of a two-dimensional (2D) block into coefficients of a one-dimensional (1D) vector through coefficient scanning method. For example, the reordering unit 160 may scan a DC coefficient to a coefficient in the high-frequency region using a predetermined scan type, and change it into a one-dimensional vector form.

The entropy encoding unit 165 may perform entropy encoding on the basis of the values obtained by the rearrangement unit 160. Various encoding methods, such as exponential Golomb coding, context-adaptive variable length coding (CAVLC), or context-adaptive binary arithmetic coding (CABAC), may be used for entropy encoding.

The entropy encoding unit 165 may encode various information such as residual coefficient information, block type information, prediction mode information, division unit information, prediction unit information, transmission unit information, motion vector information, reference image information, interpolation information of a block, filtering information, and the like, from the reordering unit 160 and the prediction units 120 and 125. In the entropy encoding unit 165, the coefficients of the transform block may be encoded based on a flag indicating whether a value of the coefficient is a zero and signaled in unit of a sub-block in the transform block, a flag indicating whether the absolute value of the coefficient is greater than 1 or not, whether the absolute value of the coefficient is greater than 2. The entropy encoding unit 165 encodes the sign of the coefficient only for non-zero coefficients. A coefficient having an absolute value of the coefficient larger than 2 is encoded by subtracting 2 from the absolute value.

The entropy encoding unit 165 may entropy-encode the coefficient value of the encoding unit input from the reordering unit 160.

The inverse quantization unit 140 and the inverse transform unit 145 dequantize the values which are quantized by the quantization unit 135 and inverse-transform the values which are transformed by the transform unit 130. A reconstructed block may be generated by adding the residual values to the predicted PU. The residual values may be generated by the inverse quantization unit 140 and the inverse transform unit 145. The predicted PU may be predicted by the motion vector prediction unit, the motion compensation unit, and the intra prediction unit of the prediction units 120 and 125.

The filter unit 150 may include at least one of a deblocking filter, an offset unit, and an adaptive loop filter (ALF).

The deblocking filter may remove block distortion generated by boundaries between blocks in a reconstructed image. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset unit may apply the offset with respect to the original image to the deblocking filtered image, in units of pixels. A region to which the offset may be applied may be determined after partitioning pixels of a image into a predetermined number of regions. The offset may be applied to the determined region in consideration of edge information on each pixel or the method of applying the offset to the determined region.

The ALF may perform filtering based on a comparison result of the filtered reconstructed image and the original image. Pixels included in an image may be partitioned into predetermined groups, a filter to be applied to each group may be determined, and differential filtering may be performed for each group. Information on whether to apply the ALF may be transferred by each coding unit (CU) and a shape and filter coefficients of an ALF to be applied to each block may vary. Further, an ALF with the same form (fixed form) may be applied to a block regardless of characteristics of the block.

The memory 155 may store a reconstructed block or image output from the filter unit 150, and the stored reconstructed block or image may be supplied to the prediction units 120 and 125 when performing inter prediction.

Figure 2:
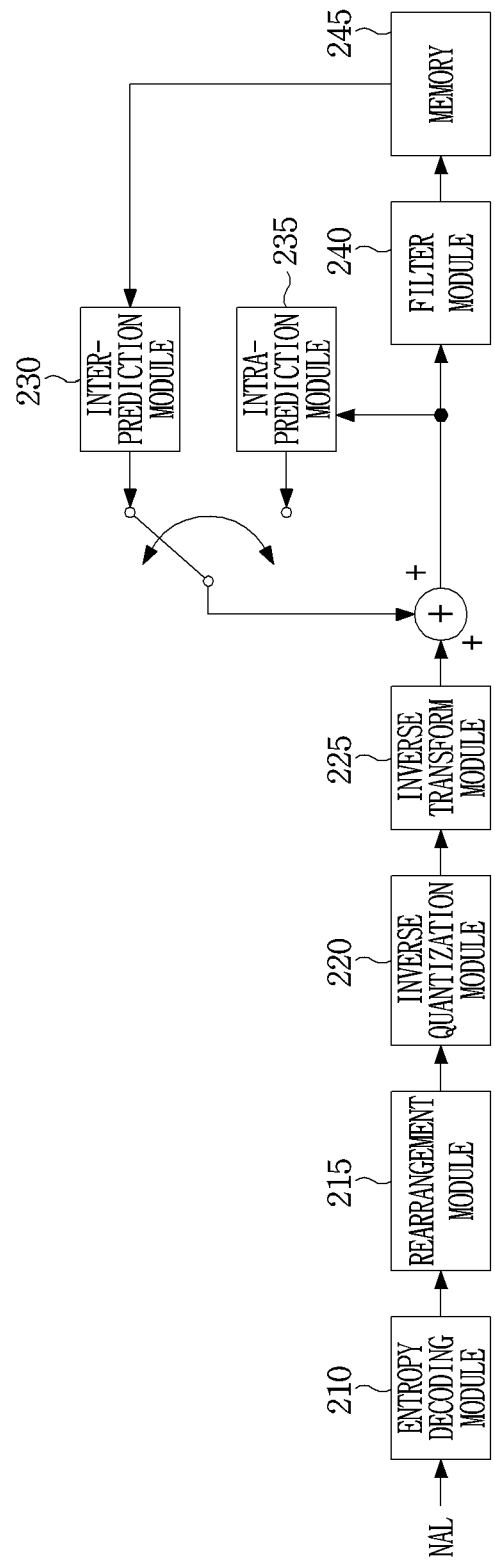
FIG. 2 is a block diagram of an image decoding apparatus according to an embodiment of the present invention.

FIG. 2 is a block diagram of an image decoding apparatus according to an embodiment of the present invention.

Referring to FIG. 2, the image decoding apparatus 200 may include an entropy decoding unit 210, a rearrangement unit 215, a dequantization unit 220, an inverse transform unit 225, prediction units 230 and 235, a filter unit 240, and a memory 245.

When an image bitstream is input in the image encoding apparatus, the input bitstream may be decoded in a procedure opposite to that of the image encoding apparatus.

The entropy decoding unit 210 may perform entropy decoding in a procedure opposite to that in which entropy encoding is performed in the entropy encoding unit of the image encoding apparatus. For example, various methods such as Exponential Golomb, Context-Adaptive Variable Length Coding (CAVLC), and Context-Adaptive Binary Arithmetic Coding (CABAC) may be applied in accordance with the method performed by the image encoding apparatus. In the entropy decoding unit 210, the coefficients of the transform block may be decoded based on a flag indicating whether a value of the coefficient is a zero or not and signaled in unit of a sub-block in the transform block, a flag indicating whether the absolute value of the coefficient is greater than 1, whether the absolute value of the coefficient is greater than 2. Then, the entropy decoding unit 210 decodes the sign of the coefficient with respect to the non-zero coefficient. A coefficient whose absolute value is larger than 2 may be decoded by subtracting 2.

The entropy decoding unit 210 may decode information associated with intra prediction and inter prediction performed by the encoding apparatus.

The rearrangement unit 215 may perform rearrangement on the bitstream entropy-decoded by the entropy decoding unit 210. The rearrangement unit 215 may reconstruct and rearrange coefficients of a 1D vector into coefficients of a 2D block. The rearrangement unit 215 may be provided with information on coefficient scanning performed by the encoding apparatus and may perform rearrangement using a method of inversely scanning the coefficients, on the basis of scanning order performed by the encoding apparatus.

The dequantization unit 220 may perform dequantization on the basis of a quantization parameter and the rearranged coefficients of the block.

The inverse transform unit 225 may perform inverse-transform of the dequantized transform coefficients based on a predetermined transform type. At this time, the transform type may be determined based on at least one of a prediction mode (inter/intra prediction), a size/shape of a block, an intra prediction mode.

The prediction units 230 and 235 may generate a prediction block on the basis of information for generating prediction block and information on a previously-decoded block or image provided. The information for generating prediction block may be provided from the entropy decoding unit 210. The information on a previously-decoded block or image may be provided from the memory 245.

The prediction units 230 and 235 may include a PU determination unit, an inter prediction unit and an intra prediction unit. The PU determination unit may receive a variety of information, such as PU information, intra prediction mode-related information of the intra prediction method and motion prediction-related information of an inter prediction method, etc. from the entropy decoding unit 210, may determine a PU for a current CU. The PU determination unit may determine which of the inter prediction and the intra prediction is performed on the PU. An inter prediction unit 230 may perform inter prediction on a current PU on the basis of information on at least one image among a previous image and a subsequent image of a current image including the current PU. An inter prediction unit 230 may use information necessary for inter prediction for the current PU provided from the encoding apparatus. The inter prediction may be performed on the basis of the information of the pre-reconstructed partial region in the current image including the current PU.

In order to perform inter prediction, it may be determined, in an unit of a CU, whether a motion information generation method for a PU included in the CU is a merge mode or a motion estimation method.

An intra prediction unit 235 may generate a prediction block on the basis of pixel information in a current image. When a PU is a PU for which intra prediction is performed, intra prediction may be performed based on intra prediction mode information on the PU provided from the encoding apparatus. The intra prediction unit 235 may include an AIS (Adaptive Intra Smoothing) filter, a reference pixel interpolation unit, and a DC filter. The AIS filter performs filtering on reference pixels of a current block. The AIS filter may decide whether to apply the filter or not, depending on a prediction mode for the current PU. AIS filtering may be performed on the reference pixels of the current block using the prediction mode for the PU and information on the AIS filter provided from the encoding apparatus. When the prediction mode for the current block is a mode not performing AIS filtering, the AIS filter may not be applied.

When the prediction mode for the PU indicates a prediction mode of performing intra prediction on the basis of pixel values obtained by interpolating the reference pixels, the reference pixel interpolation unit may generate reference pixels in a unit of a fractional pixel less than an integer pixel (i.e. full pixel) by interpolating the reference pixels. When the prediction mode for the current PU indicates a prediction mode of generating a prediction block without interpolating the reference pixels, the reference pixels may not be interpolated. The DC filter may generate a prediction block through filtering when the prediction mode for the current block is the DC mode.

The reconstructed block or image may be provided to the filter unit 240. The filter unit 240 includes a deblocking filter, an offset unit, and an ALF.

The image encoding apparatus may provide information on whether the deblocking filter is applied to a corresponding block or image, and information on which of a strong filter and a weak filter is applied when the deblocking filter is used. The deblocking filter of the image decoding apparatus may be provided with information on the deblocking filter from the image encoding apparatus and may perform deblocking filtering on a corresponding block.

The offset unit may apply offset to the reconstructed picture on the basis of information on an offset type and offset value applied to the picture in the encoding process.

The ALF may be applied to a CU on the basis of information on whether the ALF is applied and ALF coefficient information, etc. provided from the encoding apparatus. The ALF information may be included and provided in a specific parameter set.

The memory 245 may store the reconstructed image or block for use as a reference image or a reference block and may provide the reconstructed image to an output unit.

Figure 5:
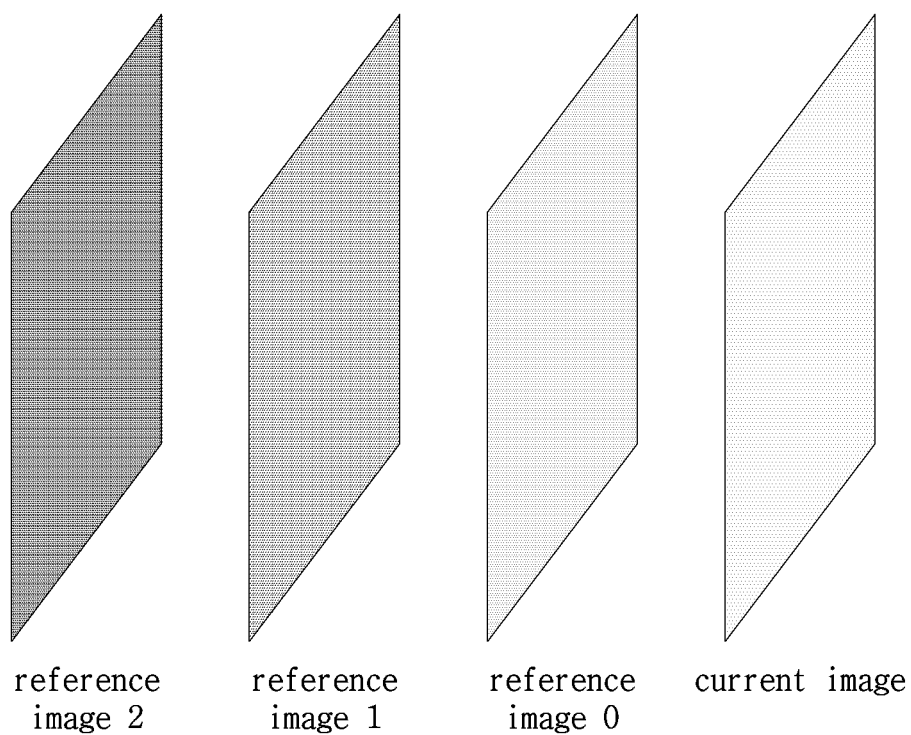
FIG. 5 is a diagram illustrating a brightness change pattern between a current image including a current block and a reference image.

FIG. 5 is a diagram illustrating a brightness change pattern between a current image including a current block and a reference image.

In case of inter prediction for the current block, the greater the brightness change between the current image and the reference image, the greater the brightness change between the current block and the prediction block to be selected in the reference image. Therefore, it may be expected that the energy of the residual signal of the current block increases as the error due to the inter prediction of the current block increases. And, as the energy for the residual signal increases, it may be expected that the error due to the quantization also increases. As a result, when there is a brightness change between the current image and the reference image, the error for the residual block will increase as compared with the case where there is no brightness change.

Accordingly, in the present invention, a method of generating a weight prediction parameter by estimating a brightness change between images and performing an inter prediction using the weight prediction parameter is proposed. By using the weight prediction parameter in the inter prediction, it is possible to prevent the energy of the residual block from increasing sharply and to improve the prediction efficiency.

The weight prediction parameter may be generated in consideration of a change in the brightness of the current image and the reference image such as a fade-in or a fade-out. However, when the weight prediction parameter is determined by considering only the above factors, it is difficult to cope with the case where the brightness of the current image and the reference image are changed by a plurality of light sources or the brightness of only the local region in the current image changes. Accordingly, in the present invention, a method of estimating a weight prediction parameter is also proposed in consideration of the case where the brightness varies by a plurality of light sources or the case where the brightness of only the local region changes.

Hereinafter, inter prediction using a weight prediction parameter will be described in detail with reference to the drawings.

Figure 6:
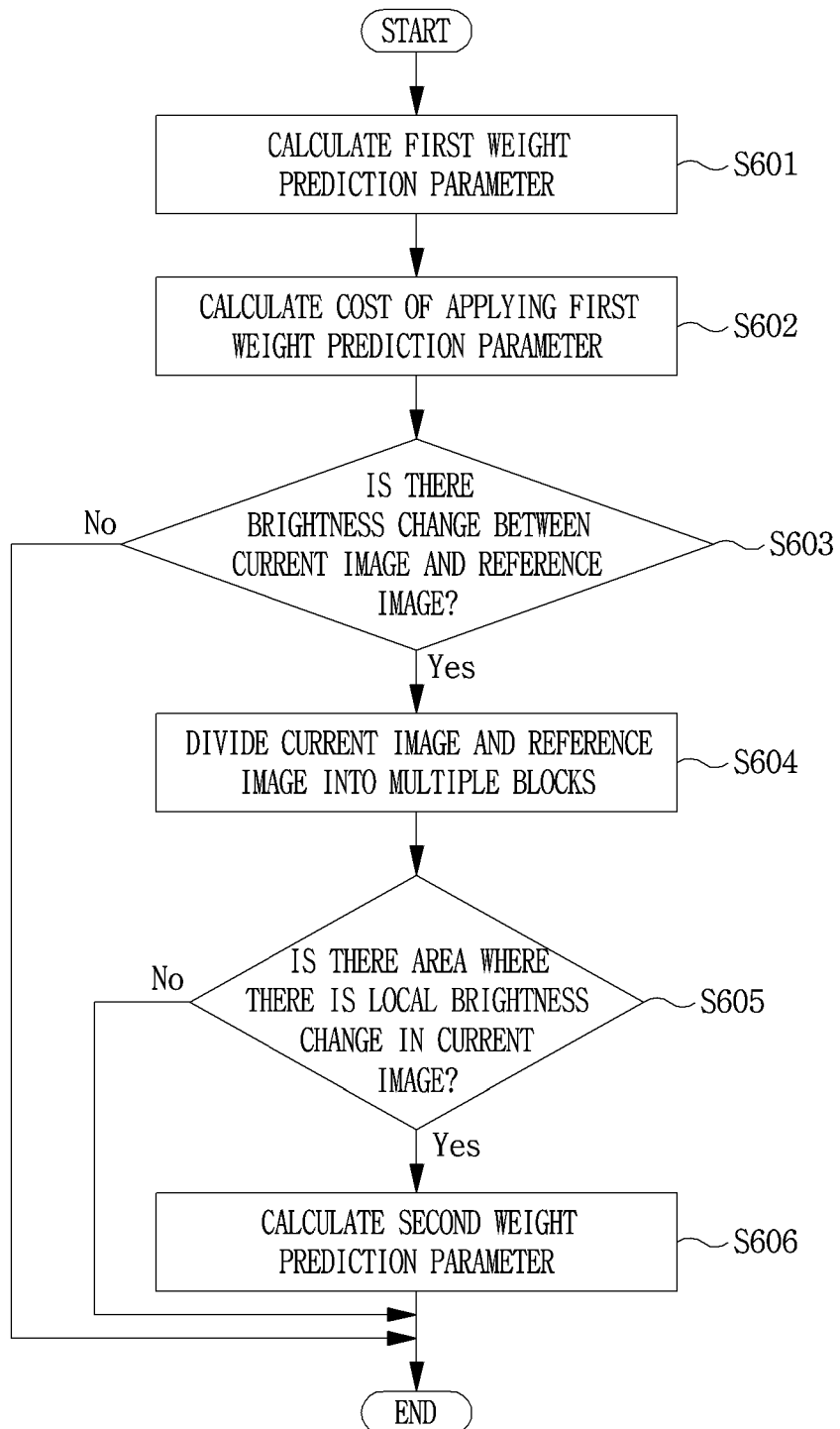
FIG. 6 is a flowchart illustrating a method of estimating a weight prediction parameter in the image encoding apparatus.

FIG. 6 is a flowchart illustrating a method of estimating a weight prediction parameter in the image encoding apparatus.

The weight prediction parameter may be generated based on the brightness change between the current image and the reference image. For convenience of explanation, in the following embodiments, a weight prediction parameter generated based on a brightness change between a current image and a reference image is referred to as a 'first weight prediction parameter', and a weight prediction parameter generated based on a brightness change between a part of a current image and a part of a reference image is referred to as a 'second weight prediction parameter'. The languages 'first' and 'second' of a weight prediction parameter are merely imposed for convenience of description, and it is not limited that the first weight prediction parameter and the second weight prediction parameter should have different properties.

The encoding apparatus may estimate the first weight prediction parameter for the reference image using the current image and the reference image before encoding the image (S601). For example, the encoding apparatus may assign a first weight prediction parameter to each of a plurality of reference images included in the reference image list.

The first weight prediction parameter is a value generated based on a brightness variation between the reference image and the current image.

When the first weight prediction parameter is used in the inter prediction of the current block, the prediction block may be generated based on the reference block indicated by the motion vector and the first weight parameter for the reference image including the reference block.

The first weight prediction parameter may include at least one of a multiplication parameter multiplied by the prediction pixel or an addition parameter added to the prediction pixel. At this time, the multiplication parameter and the addition parameter may be derived based on a regression analysis. For example, the following equation (1) shows an example of a regression analysis model.

$$e^2 = \Sigma[Y-(wX+o)]^2 \qquad \text{[equation 1]}$$

In Equation (1), Y represents data of the current image, X represents data of the reference image, w represents the slope of the regression line, o represents the intercept value of the regression line, and e represents the regression line prediction error. In this case, Y is a pixel value of the current image, and the whole or a part of the current image may be a range. X may be a pixel value of the reference image, and a whole or a part of the reference image may be a range.

The first weight prediction parameter may be obtained by partially differentiating Equation 1 into w and o, respectively. For example, when the equation (1) is partially differentiated into w and o, w and o, which minimize the square of the error (e), may be set as multiplication parameters and addition parameters, respectively.

The first weight prediction parameter value calculated based on Equation (1) may have a real value. The first weight prediction parameter may be set to a real value calculated based on Equation (1) or an integer value obtained by integerizing a real value calculated based on Equation (1). In one example, the first weight prediction parameter may be derived as an integer value that is derived by multiplying a real number value calculated based on Equation (1) by 2N. The variable N used for integerizing the first weight prediction parameter may be encoded on a block-by-block, region-by-region basis, or upper header.

When the first weight parameter is determined, the encoding apparatus may calculate the cost according to whether the first weight parameter is applied (S602). For example, the encoding apparatus may calculate a sum of absolute difference (SAD) between the current image and the reference image to which the first weight parameter is applied as a whole and a SAD between the reference image to which the first weight parameter is not applied and the current image. If the SAD of the reference image to which the first weight parameter is applied is smaller than the SAD of the reference image to which the first weight parameter is not applied, it may be determined that there is a brightness change between the current image and the reference image. Conversely, if the SAD of the reference image to which the first weight parameter is applied is larger than the SAD of the reference image to which the first weight parameter is not applied, it may be determined that there is no brightness change (S603).

In addition to the above-described SAD, cost calculation may be performed using a sum of squared difference (SSD) or a sum of absolute transformed difference (SATD).

If it is determined that there is no brightness change between the current image and the reference image (S603), it may be determined that the weight prediction parameter is not used in the inter prediction for the current image. Accordingly, the inter prediction may be used for the current block included in the current image without using the weight parameter.

On the other hand, if it is determined that there is a brightness change between the current image and the reference image (S603), a process of deriving the second weight parameter for each predetermined region of the current image may be performed. For example, the second weight parameter for a predetermined region in the current image may be obtained by comparing pixel values of blocks included in the predetermined region of the current image with pixel values of blocks included in the region of the reference image. Herein, the region of the reference image corresponds to the same position as the predetermined region in the current image.

In order to calculate the second weight prediction parameter for a predetermined region in the current image, the current image and the reference image may be divided into a plurality of regions (S604). The current image and the reference image may be divided into a plurality of blocks having the same size. The current image and the reference image may be divided in the same manner, so that the number of blocks in the current image and the reference image and the position of the block may be set to be the same.

Then, the encoding apparatus may determine, based on the pixel values of each block in the current image and the reference image, whether at least one region in which a local brightness change occurs in the current image is included in the current image (S605).

In step S605, the at least one region may be composed of a set of blocks having the same or similar pixel value ratios. For example, if the average pixel value of the first block divided in the current image is 100 and the average pixel value of the first block divided in the reference image is 80, then a brightness difference between the first block in the current image and the first block in the reference image is 1.25 times. The encoding apparatus may group a block having a brightness difference of 1.25 times with a reference block or a block having a brightness difference similar to 1.25 times with the first block. As such, by grouping blocks having the same or similar brightness difference, regions in which a local brightness change exists may be identified.

That is, the encoding apparatus may compare the pixel value of the block included in the current image with the pixel value included in the reference image, and group blocks having the same or similar pixel value ratios. The grouped blocks may be treated as a single region.

The encoding apparatus may generate a second weight prediction parameter for at least one region included in the current image (S606). If there are a plurality of regions in the current image, a plurality of second weight prediction parameters may be generated. Each of regions may be generated as a set of blocks having similar pixel value ratios.

The second weight prediction parameter for each region may be obtained using Equation (1). In this case, Y may be data of a predetermined region in the current image for which a second weight prediction parameter is to be estimated, and X may be data of the region in the reference image. Herein, the region in the reference image may be the same position region as the predetermined region in the current image. For example, Y may be a pixel value within a predetermined region, and all or some of the regions may be a range, and X may be a pixel value within the same position region, and all or some of the regions may be a range. The second weight prediction parameter value calculated based on Equation (1) may have a real value. The second weight prediction parameter may be set to a real value calculated based on Equation (1) or to a value obtained by integerizing a real value calculated based on Equation (1). In one example, the second weight prediction parameter may be derived as an integer value that is derived by multiplying a real number value calculated based on Equation (1) by 2N. The variable N used for integerizing the second weight prediction parameter may be encoded on a block-by-block, region-by-region, or upper header. It is also possible to have the same value as N used for integerizing the first weight prediction parameter and to use a different N.

Figure 7:
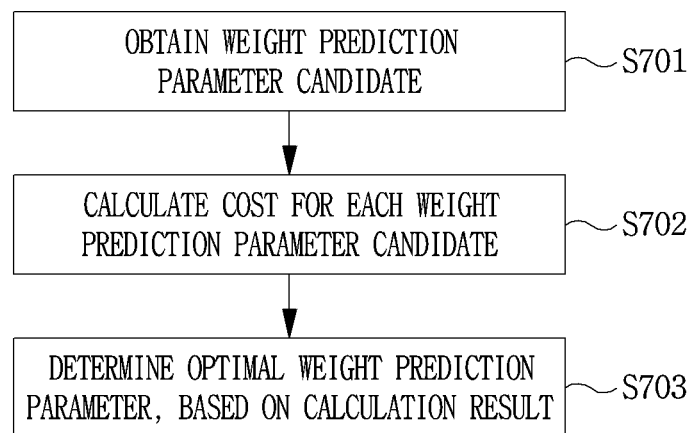
FIG. 7 is a diagram illustrating an example of performing Rate Distortion Optimization (RDO) on a prediction block using a weight parameter.

FIG. 7 is a diagram illustrating an example of performing Rate Distortion Optimization (RDO) on a prediction block using a weight parameter.

As shown in FIG. 6, when the brightness change between the current image and the reference image exists, the encoding apparatus may obtain the first weight prediction parameter, and when there is a region in which the local brightness change occurs in the current image, the encoding apparatus may obtain the second weight prediction parameter (S701). That is, the encoding apparatus may obtain a weight prediction parameter candidate that may be applied to the current block, such as a first weight prediction parameter or a second weight prediction parameter, depending on whether there is a brightness change between the current image and the reference image or a local brightness change.

If there is a brightness change between the current block and the reference image, the weight prediction parameter candidate for the current block may include the first weight prediction parameter. In addition, when there is a region in which a local brightness change is present in the current image, the weight prediction parameter candidate for the current block may further include a second weight prediction parameter. If there are a plurality of second weight prediction parameters for the current image, the weight prediction parameter candidate may include a plurality of second weight prediction parameters.

The encoding apparatus may apply the weighting parameters set as the weighting prediction parameter candidate to the current block and calculate the respective costs (S702). Then, the encoding apparatus may determine an optimal weight prediction parameter for the current block based on the calculation result (S703).

Determining the weight prediction parameter for the current block corresponds to selecting one of the plurality of weight prediction parameter candidate that exhibits the best inter prediction performance for the current block. For example, if a first weight prediction parameter is derived for a reference image and a second weight prediction parameter is derived for a predetermined region in the current image, the optimal weight prediction parameter for the current block among the first weight prediction parameter and the second weight prediction parameter may be selected.

For this purpose, the encoding apparatus may select an optimal weight prediction parameter by comparing the results of the inter prediction of each of the weight prediction parameter candidates. For example, the encoding apparatus may determine the optimal weight prediction parameter of the current block according to the inter prediction performance results of the first weight prediction parameter and the plurality of second weight prediction parameters for the current block.

It is also possible to determine whether to perform the inter prediction using the weight prediction parameter, by comparing the result of performing the inter prediction using the weight prediction parameter candidate with the result of performing the inter prediction without using the weight prediction parameter candidate.

In the above-described example, it is described that the weight prediction parameter includes the first weight prediction parameter and, in some cases, may further include the second weight prediction parameter. Contrary to the example described above, the first weight prediction parameter may be used as the weight prediction parameter candidate only when the second weight prediction parameter is not available or when the number of the second weight prediction parameters is equal to or less than the predetermined number.

The weight prediction parameter candidate may have a fixed number, or may have a variable number. When the number of weight prediction parameter candidates is variable, the encoding apparatus may encode information indicating the number of usable weight prediction parameter candidates for the current block through a bitstream (e.g., an upper header). At this time, the number of the weight prediction parameter candidates may be variably set according to the size or depth of the current block. Accordingly, the encoding apparatus may encode information on the number of weight prediction parameter candidates that may be used according to the size or depth information of the block through a bitstream (e.g., an upper header).

As another example, the encoding apparatus and the decoding apparatus may define to use the same number of weight prediction parameter candidates by predetermined conditions. For example, the number of weight prediction parameter candidates may be adaptively determined according to the size, shape, or intra prediction mode of the current block. It is assumed that the number of usable weight prediction parameters is 5. Five weight prediction parameter candidates may be used when the size of the current block is 8×8 or less. Four weight prediction parameter candidates may be used when the size of the current block is 16×16. Three weight prediction parameter candidates may be used when the size of the current block is 32×32. Two weight prediction parameters may be used when the size of the current block is 64×64.

If the second weight prediction parameter is not obtained for the current image, the current block may be encoded using the first weight prediction parameter. Also, if there is no brightness change between the current image and the reference image, the current block may be encoded without using the weight prediction parameter, or may be encoded using the initial weight prediction parameter.

The initial weight prediction parameter means that the multiplication parameter and the addition parameter are set to initial values. Here, the initial values of the multiplication parameter and the addition parameter may be 1 and 0, respectively. As another example, the initial value of the multiplication parameter may be set to 1<<N, and the initial value of the addition parameter may be set to zero.

In the example described above, when there is no brightness change between the current image and the reference image, the initial weight prediction parameter is illustrated as being used. It is also possible to encode the current block using the initial weight prediction parameter even when there is a brightness change between the current image and the reference image. In this case, in order to select the initial weight prediction parameter, the initial weight prediction parameter may be added as the weight prediction parameter candidate. By adding the initial weight prediction parameter as a weight prediction parameter candidate, a new index may be assigned to the initial weight prediction parameter. In this case, the index assigned to the initial weight prediction parameter may be encoded through a bitstream or may have a predetermined value.

Also, by performing RDO using the weight prediction parameter candidates including the first weight prediction parameter, the second weight prediction parameter, and the initial weight prediction parameter, it is possible to specify a weight prediction parameter suitable for the current block among the first weight prediction parameter, the second weight prediction parameter, and the initial weight prediction parameter.

Next, a method of encoding information related to the weight prediction parameter will be described.

Figure 8:
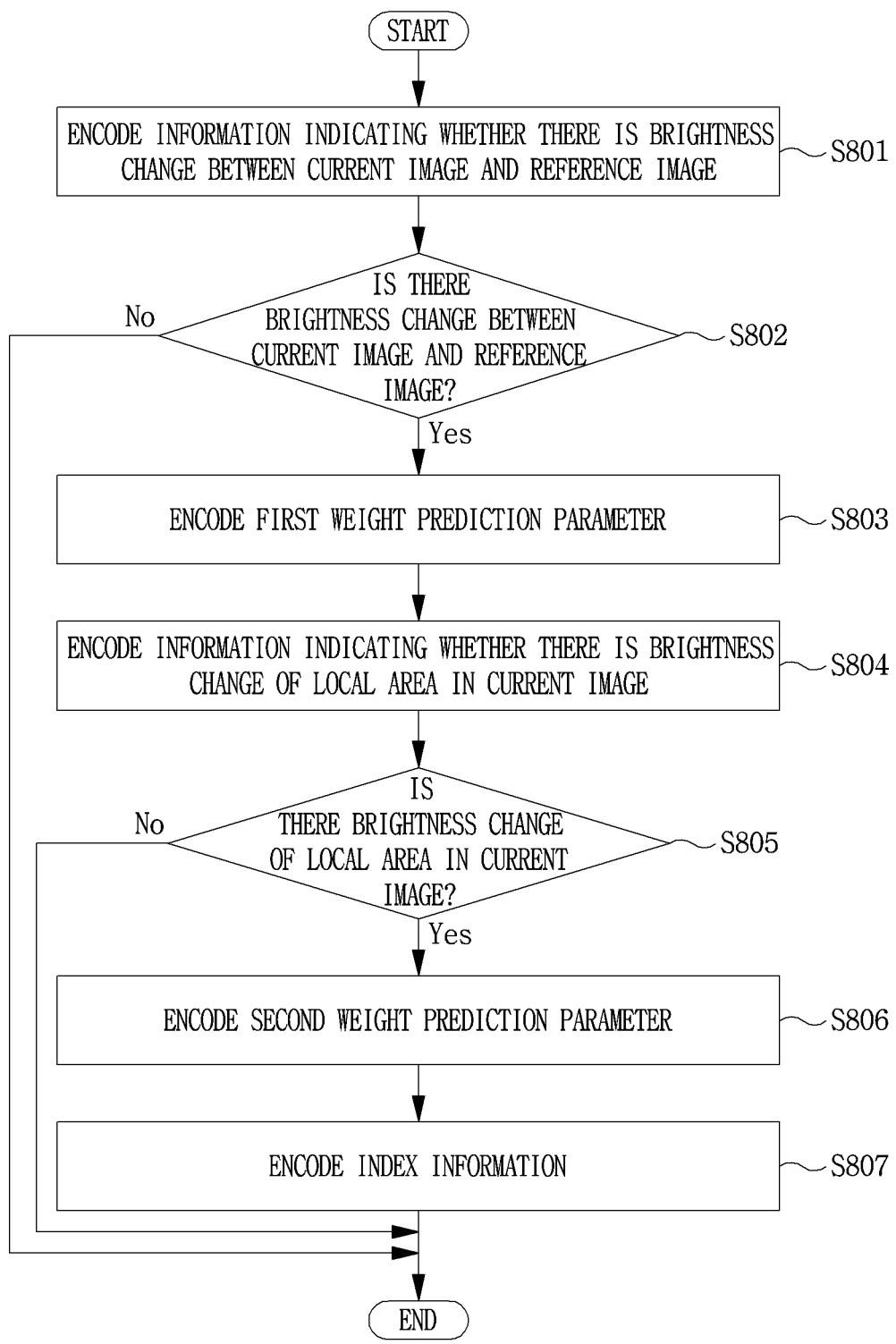
FIG. 8 is a flowchart illustrating a method of encoding information related to a weight prediction parameter for a current block.

FIG. 8 is a flowchart illustrating a method of encoding information related to a weight prediction parameter for a current block.

Referring to FIG. 8, the encoding apparatus may encode information on whether a brightness change exists for each reference image of the current image (S801). Whether to use the weight prediction parameter or not depends on whether there is a brightness change, so the information may be used for indicating whether or not a weight prediction parameter exists in the bitstream. At this time, the information on whether there is a brightness change may be a flag of 1 bit, but is not limited thereto. In addition, information on whether a brightness change exists may be encoded in a unit of a prediction block or may be encoded in a higher header than a prediction block. In one example, the information may be encoded in a unit of sequence, picture, slice, or tile. The decoding apparatus may determine whether there is a brightness change between the current image and the reference image, based on the information to be decoded from the bitstream.

When there is no brightness change between the current image and the reference image, the encoding apparatus does not perform encoding of information related to the weight prediction parameter for the current block.

On the other hand, if there is a brightness change between the current image and the reference image (S802), the encoding apparatus may encode the first weight prediction parameter and information on whether the current image include a region with at least one second weight prediction parameter (S803, S804). When the current image includes the region to which the second weight prediction parameter is assigned, information on the second weight prediction parameter is additionally encoded. Therefore, the information may be used to indicate whether the additional weight prediction parameter other than the first weight prediction parameter is present or not. Here, the information on whether the current image includes at least one region for deriving the second weight prediction parameter may be a flag of 1 bit, but is not limited thereto. Further, information on whether or not there is a brightness change may be encoded through a higher header than a prediction block. In one example, the information may be encoded in a unit of sequence, picture, slice, or tile.

If it is determined that the current image includes at least one region to which at least one second weight prediction parameter is assigned (S805), the encoding apparatus may encode the second weight prediction parameter for each of the M regions included in the current image (S806).

The information on the first weight prediction parameter and the second weight prediction parameter may be encoded in a unit of a prediction block or may be encoded in a higher header than a prediction block. For example, the information on the first weight prediction parameter and the second weight prediction parameter may be encoded in a unit of a sequence, picture, slice, or tile.

It is also possible to encode the first weight prediction parameter and the second weight prediction parameter in different layers. For example, the first weight prediction parameter may be encoded on a video basis, and the second weight prediction parameter may be encoded on a slice basis.

The first weight prediction parameter and the second weight prediction parameter may include a multiplication parameter and an addition parameter. At this time, the multiplication parameter may be divided into a prediction value determined based on the precision N for the multiplication parameter and a difference value between the multiplication parameter and the prediction value. For example, 1<<N may be set as a prediction value of a multiplication parameter, and a difference between a multiplication parameter and a prediction value (1<<N) may be set as a difference value. The encoding apparatus may encode the information about the multiplication parameter by encoding the difference value. The precision N of the current block may be encoded in a unit of a block, slice, or picture, and may be transmitted to the decoding apparatus through the bitstream.

Alternatively, it is also possible to determine the precision N of the current block in the same way in the encoding apparatus and the decoding apparatus. For example, the precision N of the current block may be adaptively determined according to the size, type, etc. of the current block.

If it is determined that the current image does not include the region to which at least one second weight prediction parameter is assigned, encoding for the second weight prediction parameter may be omitted.

Information on the number of regions included in the current block (i.e., the number of second weight prediction parameters or the number of regions capable of deriving the second weight prediction parameter) 'M' may be encoded on a block-by-block or upper header. Alternatively, the encoding apparatus and the decoding apparatus may determine the number of regions included in the current block in the same manner, based on predetermined conditions.

If it is determined that the current image includes at least one region for deriving the second weight prediction parameter, the index information indicating the weight prediction parameter of the current block among the plurality of weight prediction parameter candidates may be encoded (S807). At this time, the index information may be encoded in units of prediction blocks.

As another example, the encoding apparatus may encode information that identifies a region in which the weight parameter and the weight prediction parameter are derived. For example, the encoding apparatus may encode the position or the size of the region in which the second weight prediction parameter and the second weight parameter are derived. The encoding apparatus may encode the index assigned to the region.

Assuming that the index of the weight prediction parameter candidates starts from index 0, the index information will indicate any one of 0 to (the number of weight prediction parameter candidates−1). Here, the number of weight prediction parameter candidates may have a fixed value or may have a variable value as in the example described above.

The plurality of weight prediction parameter candidate may include at least one of a first weight prediction parameter, a second weight prediction parameter, or an initial weight prediction parameter.

Next, an example of decoding the information on the weight prediction parameter in the decoding apparatus will be described in detail.

Figure 9:
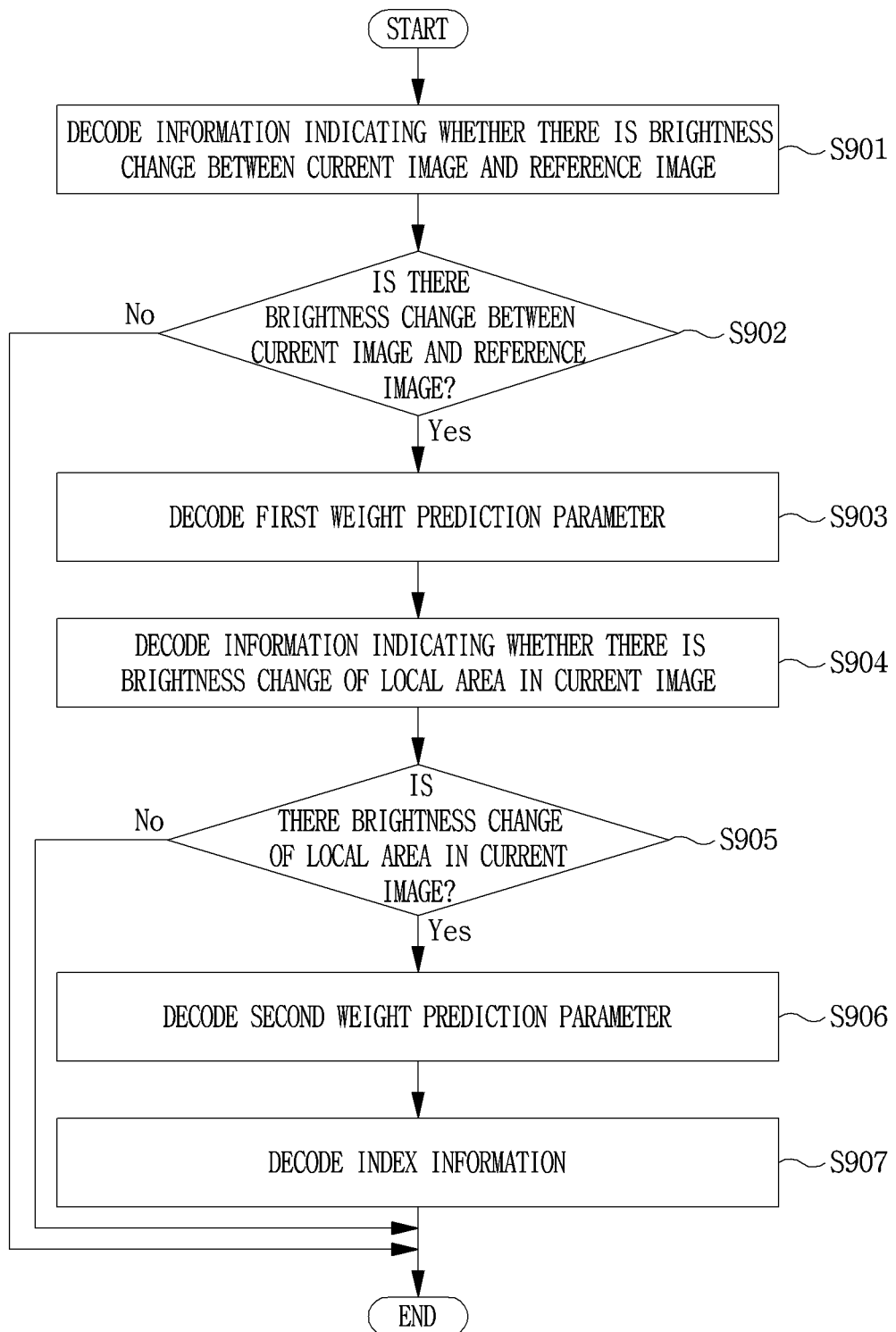
FIG. 9 is a diagram showing an example of decoding a weight prediction parameter in the decoding apparatus.

FIG. 9 is a diagram showing an example of decoding a weight prediction parameter in the decoding apparatus. Referring to FIG. 9, the decoding apparatus may decode, from a bitstream, information indicating whether the brightness of each reference image has changed compared to a current image (S901).

Based on the information, the decoding apparatus may determine whether the first weight prediction parameter exists for the current block (S902). For example, if it is determined that there is no brightness change between the current image and the reference image based on the information, the decoding apparatus may not decode information related to the weight prediction parameter.

On the other hand, if it is determined that there is a brightness change between the current image and the reference image (S902), the decoding apparatus may decode the first weight prediction parameter and the information indicating whether the current image includes at least one region capable of deriving the second weight prediction parameter (S903, S904).

If at least one region capable of deriving the second weight prediction parameter is included in the current image, the decoding apparatus may decode the information related to the second weight prediction parameter from the bitstream (S905). Based on the information, the decoding apparatus may determine whether or not a second weight prediction parameter exists for the current block.

If there are a plurality of M regions capable of deriving the second weight prediction parameter in the current image, the decoding apparatus may decode information on the M second weight prediction parameters (S906).

At this time, information on the first weight prediction parameter and the second weight prediction parameter may be decoded in units of a prediction block or decoded in a higher header than a prediction block. For example, the information on the first weight prediction parameter and the second weight prediction parameter may be decoded in a sequence, picture, slice, or tile unit.

The first weight prediction parameter and the second weight prediction parameter may be decoded in different layers. For example, the first weight prediction parameter may be decoded on a video basis, while the second weight prediction parameter may be decoded on a slice basis.

The first weight prediction parameter and the second weight prediction parameter may include a multiplication parameter and an addition parameter. At this time, the decoding apparatus may decode the information indicating the difference value between the multiplication parameter and the prediction value of the multiplication parameter, according to the precision N with respect to the multiplication parameter. If the precision for the multiplication parameter is N, (1<<N) may be set as a prediction value of the multiplication parameter.

Thereafter, the decoding apparatus may decode the index information specifying the weight prediction parameter of the current block among the plurality of weight prediction parameter candidates (S907). When the weight prediction parameter for the current block is specified by the index information, inter prediction of the current block may be performed based on the specified weight prediction parameter.

Specifically, the decoding apparatus may obtain the first prediction pixel by performing inter prediction on the current block, and obtain the second prediction pixel by applying the weight predictive parameter to the obtained first prediction pixel. In one example, the second prediction pixel may be obtained by multiplying the first prediction pixel by the multiplication parameter and adding the addition parameter.

As another example, the decoding apparatus may decode the information that identifies the region from which the weight prediction parameter and the weight prediction parameter are derived. For example, the decoding apparatus may decode the position or size of the region to which the second weight prediction parameter and the second weight parameter are allocated. The decoding apparatus may decode an index allocated to the region. In this case, the decoding apparatus may adaptively select the weight prediction parameter according to whether or not the current block is included in the region to which the second weight prediction parameter is allocated. For example, when the current block is included in the region to which the second weight prediction parameter is not allocated, the decoding apparatus may select the weight prediction parameter for the current block using the first weight prediction parameter. On the other hand, when the current block is included in the region to which the second weight prediction parameter is allocated, the decoding apparatus performs inter prediction on the current block using the second weight prediction parameter allocated to the region including the current block.

In the embodiment described above, it is determined whether or not the first weight prediction parameter may be used as the weight prediction parameter candidate, based on the information indicating whether a brightness change exists between the current image and the reference image. It has been described that it is determined whether or not the second weight prediction parameter may be used as the weight prediction parameter candidate, depending on whether or not the current image includes a region capable of deriving the weight prediction parameter. That is, whether or not to add the second weight prediction parameter to the weight prediction candidate is determined according to whether or not the current image includes a region capable of deriving the weight prediction parameter.

In contrast to the example described above, when there is a change in brightness between the current image and the reference image, the encoding apparatus determines the number of usable weight prediction parameter candidates as the number of available weight prediction parameter candidates, instead of the information indicating whether the current image includes the second weight prediction parameter Or may be encoded.

In this case, the decoding apparatus may decode at least one or more weight prediction parameter candidates based on the received number information. For example, when the number of usable weight prediction parameters is N, the weight prediction parameter candidates may be configured using one first weight prediction parameter and (N−1) second weight prediction parameters.

In the embodiment described above, the weight prediction parameter includes the first weight prediction parameter which is generated by a brightness difference between a current image and a reference image and the second weight prediction parameter generated by a brightness difference between a partial region in the current image and a partial region in the reference image. However, the first weight prediction parameter and the second weight prediction parameter described above are only illustrative of an embodiment in which the weight prediction parameter is generated, and the present invention is not limited thereto.

Next, a method of performing inter prediction using a weight prediction parameter set will be described in detail.

Figures 10, 11:
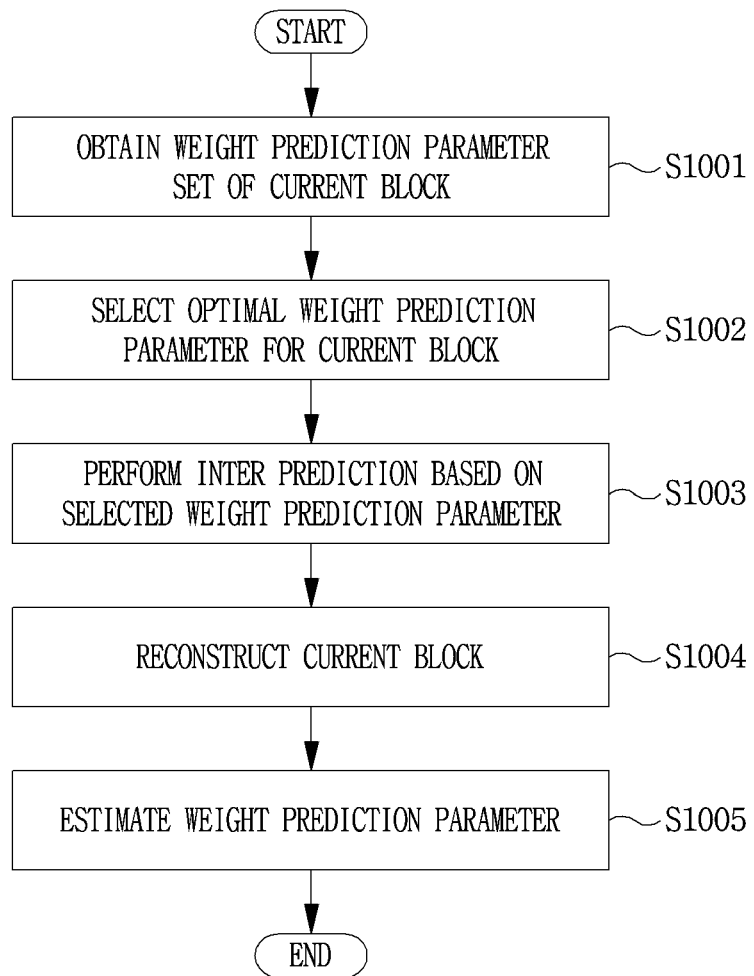
FIG. 10 is a flowchart showing a method of using a weight prediction parameter in an encoding apparatus.
FIG. 11 is a diagram showing weight prediction parameters of neighboring blocks neighboring the current block.

FIG. 10 is a flowchart showing a method of using a weight prediction parameter in an encoding apparatus.

The encoding apparatus may generate a weight prediction parameter set for the current block based on the weight prediction parameters of the blocks encoded prior to the current block to be encoded (S6S1001). Here, the weight prediction parameter set may include weight prediction parameters of blocks in which inter prediction is used, among blocks encoded prior to the current block.

The encoding apparatus may generate the weight prediction parameter set based on the weight prediction parameters used in the neighboring blocks adjacent to the current block among the blocks encoded before the current block. Here, the neighboring block neighboring the current block may include a spatial neighboring block and a temporal neighboring block. For example, the spatial neighboring block may include a left upper block, an upper block, a right upper block, a left block, and a lower left block adjacent to the current block, and a temporal neighboring block of the current block may include a collocated block existing at the same position as the current block. The collocated block exists in the reference image.

The encoding apparatus may construct a weight prediction parameter set based on the weight prediction parameters for the reconstructed block encoded before the current block and the prediction block corresponding to the reconstructed block.

The weight prediction parameter may be set differently according to the inter prediction direction. For example, the forward weight prediction parameter may be used when a block to be encoded performs forward prediction, and the backward weight prediction parameter may be used when a block to be encoded performs backward prediction. In the case of encoding a block by performing bi-directional prediction, both a forward weight prediction parameter and a backward weight prediction parameter may be used. In this case, the forward direction indicates a reference image that is the past of the current image (i.e., a reference image having a POC smaller than the POC of the current image), and the reverse direction indicates a reference image that is the future of the current image (i.e., a reference image having a POC greater than the POC of the current image).

The encoding apparatus may construct a weight prediction parameter set of the current block by using at least one of the forward weight prediction parameter and the backward weight prediction parameter for the neighboring block, based on the inter prediction direction of the current block.

FIG. 11 is a diagram showing weight prediction parameters of neighboring blocks neighboring the current block.

In the example shown in FIG. 11, A to E denote the spatial neighboring blocks of the current block, and Col denotes the temporal neighboring block of the current block. Please refer to the example shown in FIG. 4 with regard to the positions of A to E and Col.

Referring to FIG. 11, neighboring blocks have at least one of a forward weight prediction parameter (i.e., a weight parameter assigned to list 0) and a backward weight prediction parameter (i.e., a weight parameter assigned to list 1).

The encoding apparatus may determine weight prediction parameters of neighboring blocks to be included in the weight prediction parameter set, according to the prediction direction of the current block. For example, if the current block is encoded through forward prediction, a weight prediction parameter set may be constructed using forward weight prediction parameters of neighboring blocks, and if the current block is encoded through backward prediction, a weighted prediction parameter set may be constructed using backward weight prediction parameters of the neighboring blocks. If the current block is encoded using bi-directional prediction, a weight prediction parameter set may be constructed using forward weight prediction parameter and backward weight parameter of neighboring blocks.

For example, in the example shown in FIG. 11, if the current block is encoded in the forward prediction, the forward weight prediction parameters of the neighboring blocks, (65,1), (64,2), (66,2), (61,7), (59,2) may be included in the weight prediction parameter set.

Here, the weight prediction parameter may include at least one of a multiplication parameter multiplied by the prediction sample or an addition parameter added to the prediction sample. In FIG. 11, the weight prediction parameter is expressed in the form of (w, o). Here, w denotes a multiplication parameter, and o denotes an addition parameter.

The encoding apparatus may select an optimal weight prediction parameter for the current block from the weight prediction parameters included in the weight prediction parameter set (S6S1002). When the optimal weight prediction parameter for the current block is selected, the encoding apparatus may encode information (e.g., index information) specifying the selected weight prediction parameter.

When the optimal weight prediction parameter is selected, an inter prediction for the current block may be performed based on the selected weight prediction parameter (S6S1003). For example, the inter prediction of the current block may be performed by multiplying the prediction pixel obtained through the motion compensation by the multiplication parameter, and then adding the addition parameter.

If a prediction block is generated as an inter prediction result for the current block, the current block may be reconstructed based on the generated prediction block and the residual block after the inverse quantization and inverse transform (S6S1004).

Assuming that a block to be encoded next to the current block is encoded based on an inter prediction, the weight prediction parameter set of the next block may be generated using the weight prediction parameter of the current block. At this time, the weight prediction parameter of the current block usable in the next block may be any one selected from the weight prediction parameter set of the current block.

As another example, the weight prediction parameter of the current block usable for the next block may be estimated from the reconstruction block and the prediction block of the current block. In this case, the encoding apparatus may perform the weighted prediction parameter estimation on the current block so as to configure the weight prediction parameter set for the next block of the current block (S6S1005).

The reconstruction block has a quantization error with respect to the original block, but the brightness change characteristic in the reconstruction block has a pattern similar to that of the original block. Accordingly, in the decoding apparatus, the weight prediction parameter for the current block may be estimated using the reconstruction block and the prediction block for the current block in order to estimate the weight prediction parameter in the same manner as the encoding apparatus.

Specifically, if a reconstruction block is generated for the current block, the weight prediction parameter of the current block may be estimated for the next block, by using regression analysis based on the reconstruction block and the prediction block to which the weight prediction parameter is not applied. An example of regression analysis is as shown in Equation (1).

In Equation (1), Y represents data of the reconstruction block, X represents data of the prediction block, w represents the slope of the regression line, o represents the intercept value of the regression line, and e represents the error of the regression line prediction. Specifically, Y denotes the pixel value of the reconstruction block, and X denotes the pixel value of the prediction block.

The weight prediction parameter of the current block may be obtained by partially differentiating Equation 1 into w and o, respectively. For example, w and o that minimize the square of the error e may be derived as the multiplication parameter and the addition parameter, respectively, when the equation (1) is partially differentiated into w and o, respectively.

The weight prediction parameter calculated based on Equation (1) may have a real value. The weight prediction parameter of the current block may be set to a real value calculated based on Equation (1) or may be set to a value obtained by integerizing a real value calculated based on Equation (1). In one example, the weight prediction parameter may be derived as an integer value derived by multiplying a real number value calculated based on Equation (1) by 2N. The variable N used for integerizing the weight prediction parameter may be encoded through the bitstream. Alternatively, the weight prediction parameter may be integerized by using a predetermined N value of the same value in the encoding apparatus and the decoding apparatus.

In Equation (1), all the pixels in the reconstruction block are set to the input range for X, and all the pixels in the prediction block are set to the input range for Y. As another example, instead of using the pixels of the entire block, only some of the pixels through sub-sampling may be used to estimate the weight prediction parameter of the current block.

Figure 12:
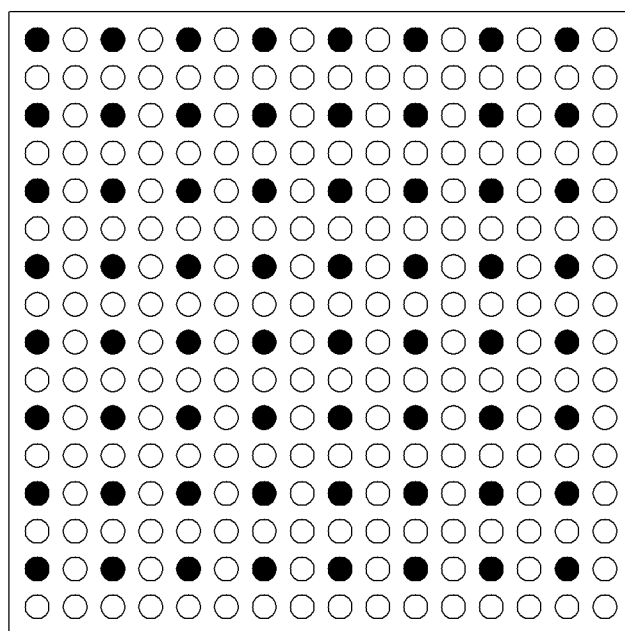
FIG. 12 is a diagram for explaining an example in which only some pixels are used for weight prediction parameter estimation of the current block.

For example, FIG. 12 is a diagram for explaining an example in which only some pixels are used for weight prediction parameter estimation of the current block. Assuming that the reconstruction block and the prediction block for the current block are sub-sampled by ½ in the horizontal and vertical directions, one of the four samples (2×2) may be used as the input of X or Y. For example, in the example shown in FIG. 12, only black pixels may be used for the regression analysis.

In the example shown in FIG. 12, the sample located at the upper left of the 2×2 samples is shown to be used for the regression analysis, but the upper right pixel, the lower left pixel, or the lower right pixel among the 2×2 pixels is set to be used for the regression analysis. Alternatively, index information may be encoded through a bitstream. The index information may indicate which one of the above-mentioned positions is used for the regression analysis.

The encoding apparatus and the decoding apparatus may perform the sub-sampling according to the predefined value or may perform the sub-sampling according to the value derived under the predefined condition. Alternatively, the encoding apparatus may encode the sub-sampling unit M and encode the sub-sampling unit M through a bitstream, thereby notifying the decoding apparatus that sub-sampling has been performed by 1/M.

The weight prediction parameter estimated for the current block may be used to construct a weight prediction parameter set for the next block.

The weight prediction parameter set of the current block may include at least one the weight prediction parameter. The maximum number of weight prediction parameters to be included in a weight prediction parameter set of the current block may be a fixed number or may be a variable number depending on the size or type of the current block or the information signaled through the bitstream. In one example, the maximum number P of maximum weight prediction parameters that the weight prediction parameter set may include may be encoded through a bitstream.

In FIG. 11, the blocks used for constructing the weight prediction parameter set of the current block are limited to A to E and Col, but blocks at other positions may also be used for constructing the weight prediction parameter set of the current block.

For example, the encoding apparatus may generate a weight prediction parameter set of a current block using a block of a predetermined position. Alternatively, the encoding apparatus may generate a weight prediction parameter set of the current block using a block of an arbitrary position. The encoding apparatus may encode information specifying the position of the block or the block which is used for generating the weight prediction parameter set of the current block through a bitstream. At this time, information specifying the position of the block or the block may be encoded through the bitstream.

If the weight prediction parameter set includes a plurality of weight prediction parameters, the weight prediction parameters may be arranged in a predetermined order. In one example, the weighted prediction parameters may be ordered in the order of the spatial neighbor block and the temporal neighbor block. Accordingly, in FIG. 11, after adding the weight prediction parameters A to E to the weight prediction parameter set, the weight prediction parameter of Col may be added to the weight prediction parameter set. As another example, the weight prediction parameters may be arranged in the order most similar to the motion information of the current block (e.g., motion vector). Alternatively, it is possible to assign higher priority to the weight prediction parameter derived neighboring reconstruction block and the prediction block based thereon and add the weight prediction parameter in the weight prediction parameter set. On the contrary, it is also possible to assign higher priority to the weight prediction parameter of the neighboring block and add the weight prediction parameter in the weight prediction parameter set.

The weight prediction parameter set may include an initial weight prediction parameter set. The initial weight prediction parameter means that the multiplication parameter and the addition parameter are set to initial values. Here, the initial values of the multiplication parameter and the addition parameter may be 1 and 0, respectively. As another example, the initial value of the multiplication parameter may be set to 1<<N, and the initial value of the addition parameter may be set to zero.

The information on the initial weight prediction parameter may be encoded through a bitstream and transmitted to a decoding apparatus. Alternatively, the initial weight prediction parameter may be set to have a fixed index in the weight prediction parameter set. In one example, the initial weight prediction parameter may be set to have index 0 in the weight prediction parameter set.

The weight prediction parameter set may include a weight prediction parameter derived on an image basis. Here, the weight prediction parameter set derived in units of images may be generated based on the brightness change between the current image and the reference image of the current image. For example, the weight prediction parameter derived in an image unit may be derived by Equation (1). At this time, all the pixels in the current image may be set to the input range for X, and all the pixels in the reference image may be set to the input range for Y.

The information on the weight prediction parameter of the image unit may be encoded through the bitstream and transmitted to the decoding apparatus. Here, the information on the weight prediction parameter may include a weight prediction parameter value or a residual value for the weight prediction parameter. For example, in a decoding apparatus, a weight prediction parameter of an image unit may be obtained by adding a prediction value and a residual value of a weight prediction parameter. At this time, the prediction value of the weight prediction parameter is determined by the precision N for the current block, and the residual value may be determined based on the information to be decoded from the bitstream.

At this time, the precision N of the current block may be encoded through the bitstream and transmitted to the decoding apparatus through the bitstream.

Alternatively, it is also possible to determine the precision N of the current block in the same way in the encoding apparatus and the decoding apparatus. For example, the precision N of the current block may be adaptively determined according to the size, shape, etc. of the current block.

When the weight prediction parameter of the image unit is included in the weight prediction parameter set, the index allocated to the weight prediction parameter of the image unit may be encoded through the bitstream or may have a predetermined value. For example, assuming that the weight prediction parameter set is composed of up to six weight prediction parameters, the initial weight prediction parameter may be set to have index 0, and the weight prediction parameter of the image unit may be set to have index 1. Index 2 to index 5 may be used for the weight prediction parameter derived from the neighboring block.

The initial weight prediction parameter or the weight prediction parameter of the image unit may be added to the weight prediction parameter set when the number of weight prediction parameters derived from the neighboring block is smaller than the maximum number that can be included in the weight prediction parameter set. For example, the number of weight prediction parameters that can be used is four, but if the four weight prediction parameters may not be derived from the neighboring block, it is possible to include at least one of the initial weight prediction parameter or the weight prediction parameter of the image unit in the weight prediction parameter set. The four weight prediction parameters may not be derived from the neighboring block in case that the neighboring block neighboring the current block is encoded by the intra prediction or the weight prediction parameter of the neighboring block is not available because the current block is at the image boundary.

The weight prediction parameter set may include a combined weight prediction parameter generated by combining two or more weight prediction parameters. For example, when the number of weight prediction parameters that may be derived from neighboring blocks is smaller than the number of usable weight prediction parameters, the combined weight prediction parameter generated by combining two or more weight prediction parameters may be added to the weight prediction parameter set.

Assuming that the weight prediction parameter is composed of (w, o), the combined weight prediction parameter may be generated considering the prediction mode of neighboring blocks or the prediction direction of neighboring blocks.

Figure 13:
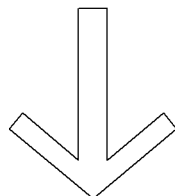
FIG. 13 shows an example in which a combined weight prediction parameter is generated.

For example, FIG. 13 shows an example in which a combined weight prediction parameter is generated.

In FIG. 13, A to D denote neighboring blocks neighboring the current block, and List 0 and 1 denote the weight prediction parameter of a neighboring block when a forward reference image and a backward reference image are used, respectively.

In FIG. 13, A has only forward weight prediction parameter by performing forward prediction, and D has only backward weight prediction parameter by performing backward prediction. C has both a forward weight prediction parameter and a backward weight prediction parameter as it performs bi-directional prediction. B is shown as having neither forward weight prediction parameter nor backward weight prediction parameter. In one example, if B is encoded by intra prediction, then B will not have a weight prediction parameter.

Accordingly, in the example shown in FIG. 13, the forward weight prediction parameter (i.e., the weight prediction parameter for List 0) may be obtained only from the A and C blocks and the backward weight prediction parameter (i.e., the weight prediction parameter for List 1) may be obtained only from the C and D blocks.

Assuming that the weight prediction parameter set of the current block can include four forward weight prediction parameters, the remaining two forward weight prediction parameters, excluding the two forward weight prediction parameters derived from the neighboring block, may be generated by combining two or more forward weight prediction parameters. Alternatively, when it is assumed that the weight prediction parameter set of the current block can include four backward weight prediction parameters, the remaining two backward weight prediction parameters, excluding the two backward weight parameters derived from the neighboring block, may be generated by combining two or more backward weight prediction parameters. In FIG. 13, the forward weight prediction parameters of B and D are generated by combining the forward weight prediction parameters of A and C. The backward weight prediction parameters of A and B are generated by combining the backward weight prediction parameters of C and D.

When the combined weight prediction parameter is added to the weight prediction parameter set, the index given to the combined weight prediction parameter may be determined by a predetermined priority.

If the weight prediction parameter set are not generated despite the combination of the weight prediction parameters in the neighboring blocks, all of the remaining weight prediction parameters may be set as the initial weight prediction parameters.

Figure 14:
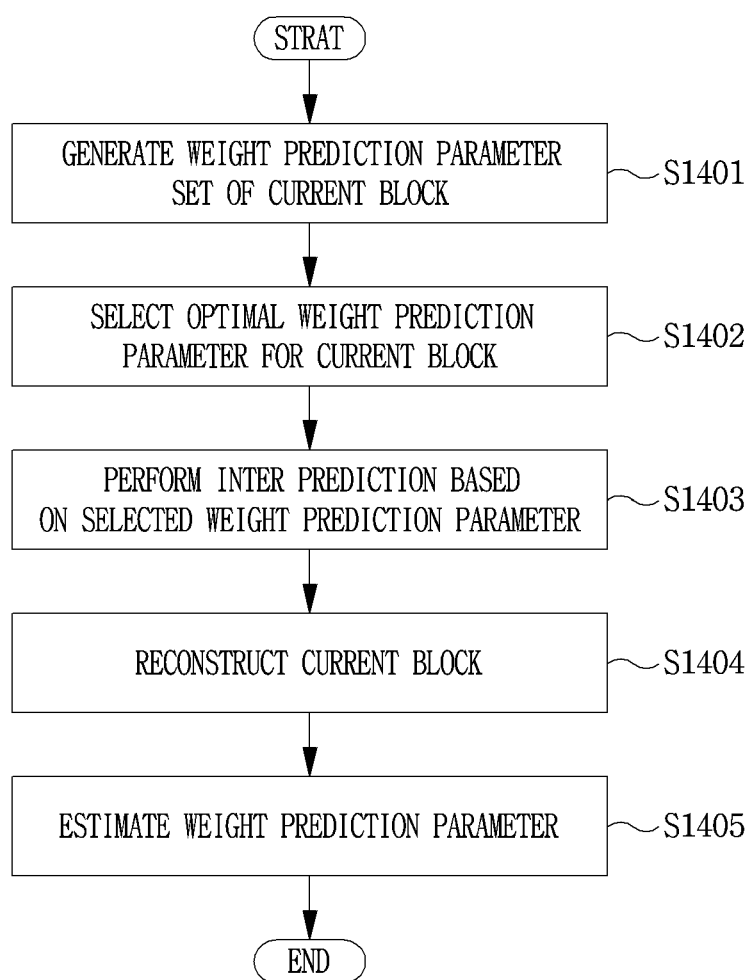
FIG. 14 shows an example of decoding a weight prediction parameter in a decoding apparatus.

FIG. 14 shows an example of decoding a weight prediction parameter in the decoding apparatus. Referring to FIG. 14, the decoding apparatus may generate a weight prediction parameter set based on weight prediction parameters of neighboring blocks neighboring the current block among blocks decoded prior to the current block (S10S1401). The generation of the weight prediction parameter set has been described in detail in the operation of the encoding apparatus, and a detailed description thereof will be omitted.

When the weight prediction parameter set for the current block is generated, the decoding apparatus may determine the weight prediction parameter for the current block based on index information (S10S1402). The index information may specify the weight prediction parameter for the current block. The specified weight prediction parameter may be any one of the weight prediction parameters included in the weight prediction parameter set. Here, the index information may be decoded from the bitstream.

When the weight prediction parameter for the current block is determined, the inter prediction for the current block may be performed using the determined weight prediction parameter (S10S1403). As an example, inter prediction of a current block may be performed by multiplying a prediction sample obtained through motion compensation by a multiplication parameter and adding addition parameters.

When a prediction block is generated as an inter prediction result for the current block, the current block may be reconstructed based on the generated prediction block and the residual block (S10S1404).

When the reconstruction of the current block is completed, the weight prediction parameter for the current block may be estimated so that the block to be decoded next to the current block can use (S10S1405). Estimation of the weight prediction parameter set of the current block has been described in detail in the operation of the encoding apparatus, and a detailed description thereof will be omitted.

Although the exemplary methods of this disclosure are represented by a series of acts for clarity of explanation, they are not intended to limit the order in which the steps are performed, and if necessary, each step may be performed simultaneously or in a different order. In order to implement the method according to the present disclosure, the illustrative steps may additionally include other steps, include the remaining steps except for some steps, or may include additional steps other than some steps.

The various embodiments of the disclosure are not intended to be all-inclusive and are intended to illustrate representative aspects of the disclosure, and the features described in the various embodiments may be applied independently or in a combination of two or more.

In addition, various embodiments of the present disclosure may be implemented by hardware, firmware, software, or a combination thereof. In the case of hardware implementation, the hardware may be implemented by one or more application specific integrated circuits (ASICs), digital signal processors (DSPs), digital signal processing devices (DSPDs), programmable logic devices (PLDs), field programmable gate arrays (FPGAs), general processor, a controller, a micro-controller, a micro-processor, and the like.

The scope of the present disclosure includes a software or machine-executable instructions (e.g., operating system, applications, firmware, program, etc.) which makes operations according to the methods of the various embodiments be performed on the apparatus or computer and a non-transitory computer-readable medium, in which such software or instructions are stored, executable on the apparatus or computer.

INDUSTRIAL AVAILABILITY

The present invention may be used for encoding/decoding an image.

The invention claimed is:
1. A method for decoding a video signal with a decoding apparatus, comprising:
  decoding, with the decoding apparatus, a residual block of a coding block from a bitstream;
  determining, with the decoding apparatus, a plurality of weight prediction parameter candidates for the coding block based on number information signaled in a unit of a sequence of the bitstream, the sequence being a higher unit than the coding block;
  determining, with the decoding apparatus, a weight prediction parameter of the coding block from the weight prediction parameter candidates based on index information signaled in the unit of the coding block;
  obtaining, with the decoding apparatus, a prediction block of the coding block by obtaining a second prediction sample of the coding block; and reconstructing, with the decoding apparatus, the coding block based on the prediction block of coding block and the residual block of the coding block, wherein the second prediction sample is obtained by applying the weight prediction parameter to a first prediction sample of the coding block resulting from performing inter prediction on the coding block, wherein only the weight prediction parameter of the coding block is used in a step of obtaining the prediction block of the coding block, wherein a remainder of the weight prediction parameter candidates except for the determined weight prediction parameter is not used in the step of obtaining the prediction block of the coding block, and wherein a number of the weight prediction parameter candidates is determined based on the number information.

2. The method of claim 1, wherein the index information indicates a neighboring block having the weight prediction parameter of the coding block among a plurality of neighboring blocks adjacent to the coding block.

3. The method of claim 2, wherein the plurality of neighboring blocks includes at least one of a top neighboring block, a left neighboring block, a top-right neighboring block, or a bottom-left neighboring block.

4. A method for encoding a video signal with an encoding apparatus, comprising:
    determining, with the encoding apparatus, a plurality of weight prediction parameter candidates for a coding block;
    determining, with the encoding apparatus, a weight prediction parameter of the coding block from the weight prediction parameter candidates;
    obtaining, with the encoding apparatus, a prediction block of the coding block by obtaining a second prediction sample of the coding block;
    obtaining, with the encoding apparatus, a residual block of the coding block based on the prediction block of the coding block and an original block of the coding block; and
    encoding, with the encoding apparatus, the residual block into a bitstream,
    wherein the second prediction sample is obtained by applying the weight prediction parameter to a first prediction sample of the coding block resulting from performing inter prediction on the coding block,
    wherein, based on the weight prediction parameter candidates, number information is encoded in a unit of a sequence of the bitstream, the sequence being a higher unit than the coding block,
    wherein a number of the weight prediction parameter candidates is determined based on the number information,
    wherein, based on the weight prediction parameter, index information is encoded in the unit of the coding block,
    wherein only the weight prediction parameter of the coding block is used in a step of obtaining the prediction block of the coding block, and
    wherein a remainder of the weight prediction parameter candidates except for the determined weight prediction parameter is not used in the step of obtaining the prediction block of the coding block.

5. A non-transitory computer-readable medium storing a bitstream generated by an encoding method, the method comprising:
    determining, with the encoding apparatus, a plurality of weight prediction parameter candidates for a coding block;
    determining, with the encoding apparatus, a weight prediction parameter of the coding block from the weight prediction parameter candidates; and
    obtaining, with the encoding apparatus, a prediction block of the coding block by obtaining a second prediction sample of the coding block,
    obtaining, with the encoding apparatus, a residual block of the coding block based on the prediction block of the coding block and an original block of the coding block; and
    encoding, with the encoding apparatus, the residual block into the bitstream,
    wherein the second prediction sample is obtained by applying the weight prediction parameter to a first prediction sample of the coding block resulting from performing inter prediction on the coding block,
    wherein, based on the weight prediction parameter candidates, number information is encoded in a unit of a sequence of the bitstream, the sequence being a higher unit than the coding block,
    wherein a number of the weight prediction parameter candidates is determined based on the number information,
    wherein, based on the weight prediction parameter, index information is encoded in the unit of the coding block,
    wherein only the weight prediction parameter of the coding block is used in a step of obtaining the prediction block of the coding block, and
    wherein a remainder of the weight prediction parameter candidates except for the determined weight prediction parameter is not used in the step of obtaining the prediction block of the coding block.

* * * * *